UNITED STATES PATENT OFFICE.

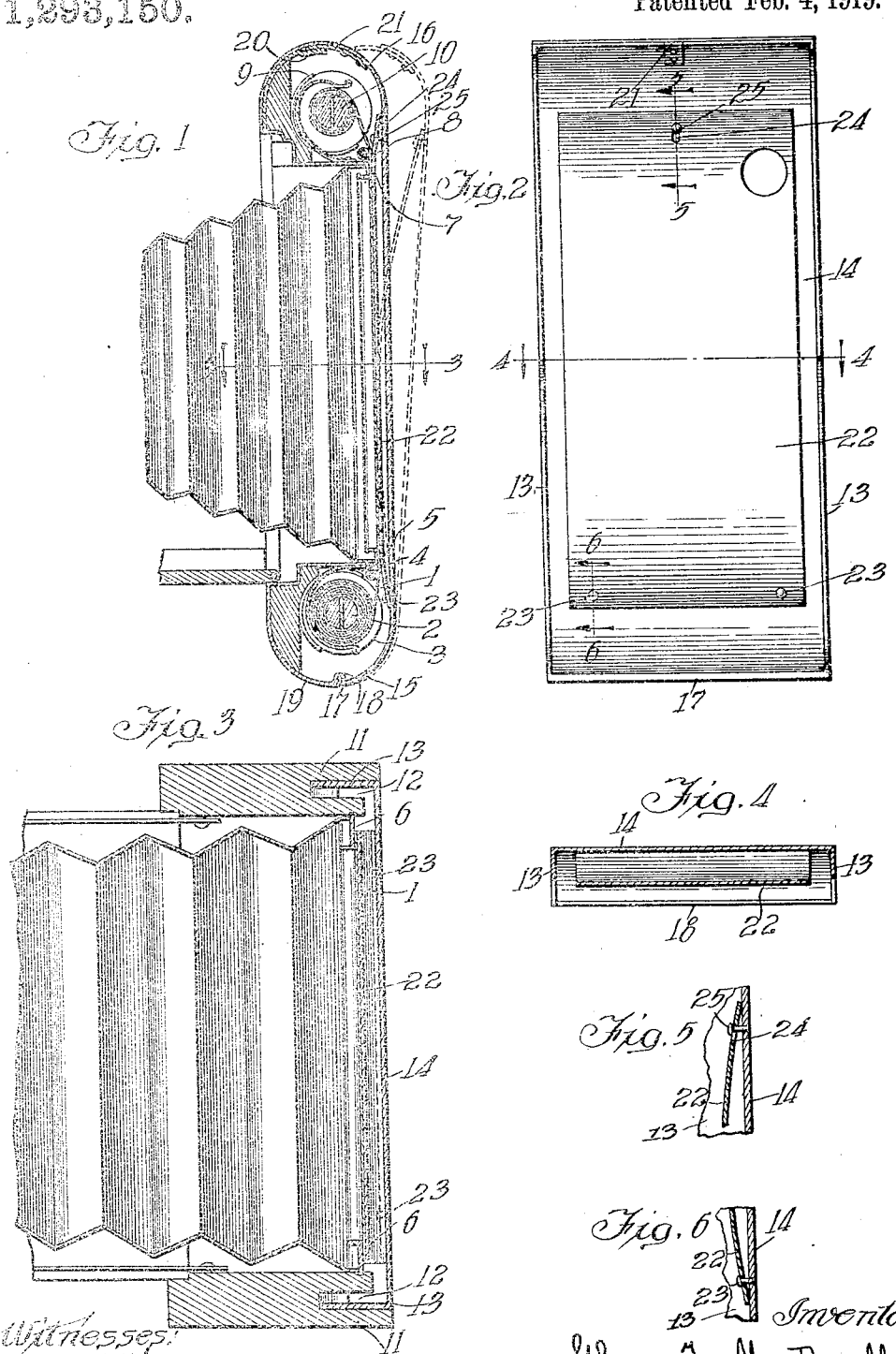

GLENN J. MacDOWELL, OF CHICAGO, ILLINOIS.

FILM-ALINING SPRING FOR CAMERAS.

1,293,150.   Specification of Letters Patent.   Patented Feb. 4, 1919.

Application filed November 17, 1916. Serial No. 131,952.

*To all whom it may concern:*

Be it known that I, GLENN J. MAC-DOWELL, citizen of the United States, residing at Chicago, in the county of Cook and State of Illinois, have invented certain new and useful Improvements in Film-Alining Springs for Cameras; and I do hereby declare the following to be a full, clear, and exact description of the invention, such as will enable others skilled in the art to which it appertains to make and use the same.

This invention relates to improvements in photographic cameras in which photographs are taken on a flexible film-strip which is drawn across the exposure plane of the camera.

This flexible film-strip used in these cameras is tightly wound upon a spool which is loaded into the camera and is unrolled therefrom and rolled upon a take-up spool at the other end of the exposure plane. As the film-strip remains tightly rolled upon the first-named spool for quite a while before it is placed in the camera it has a tendency to become set in its curled condition and will resist straightening out when drawn over the exposure plane so that it has a tendency to curl slightly in this plane unless it is maintained relatively taut.

The main object of my present invention is to provide means within the camera whereby the film-strip passed over the exposure plane is maintained absolutely flat and is held against accidental release of tension thereon so that in photographing a picture no part of the sensitized surface of the film-strip will be disposed out of the exposure plane.

A further object of the invention is to provide means accomplishing the foregoing object which will also yieldingly resist longitudinal movement of the film-strip thus necessitating sufficient tension on the latter to overcome such resistance thereby further insuring flatness of the film within the exposure plane.

A further object of the invention is to provide means whereby the preceding objects are attained which will serve simultaneously to partially open the camera back when the latch for the same is released thereby rendering the removal of such back very easy and quick of accomplishment.

The invention consists in the features of construction and combinations of parts hereinafter fully described and particularly claimed.

In the accompanying drawings illustrating a suitable embodiment of the invention:

Figure —1— is a fragmentary vertical longitudinal section of a folding pocket camera equipped with film-engaging means constructed in accordance with my invention.

Fig. —2— is a rear elevation of the removable back plate constructed in accordance with my invention.

Fig. —3— is a fragmentary detail transverse section on the line 3—3 of Fig. —1—.

Fig. —4— is a horizontal section on the line 4—4 of Fig. —2—.

Figs. —5— and —6— are fragmentary detail vertical sections on the lines 5—5 and 6—6 respectively, of Fig. —2—.

As shown in Fig. —1— the film-strip 1 is placed in the camera-housing, being carried by the film-spool 2 rotatably mounted in suitable mountings provided therefor, and illustrated at 3. Contiguous to the mountings for the spool 2 is an anti-friction roller 4 over which the film-tape passes; said roller being disposed contiguous to one end-flange 5 bordering the exposure-plane of the camera. The latter is further bordered along its side edges by flanges 6 and at its other end by a flange 7, similar to the flange 5, and contiguous to which there is another anti-friction roller 8 corresponding to the roller 4 and performing the same function. Contiguous to the last-named roller is the film-spool mounting 9 for the take-up spool 10 upon which the film-strip is adapted to be wound.

The rear end of the camera-housing is open between the side walls 11 thereof, the latter being provided with longitudinal grooves 12 in which the side edge-flanges 13 of the back 14 are received. The latter has curved end portions 15 and 16 respectively, the former being provided with a short edge flange 17 adapted to engage in the overturned edge flange 18 in an end wall 19 of the housing. On this flange 17 the back 14 is adapted to turn slightly pivotally as the latch 20 engaging the latch-member 21 at the other end of the back portion is released, said latch being of any suitable construction acting to hold the back normally in the position shown in full lines in Fig. —1—.

Secured to the inner face of the plane portion of the back 14 is a flat spring 22 which is normally bowed so that its concave face opposes the inner face of said back. The said spring is secured to the back 14 at one end by means of rivets 23, the latter being rigid with respect to the back 14, but extending relatively loosely through perforations in the end of the spring 22 so that the latter will be capable of very limited pivotal motion along that edge portion in which the rivets 23 engage. At its other end said spring 22 is provided with a longitudinal slot 24 in which a rivet 25 rigid with the back 14 engages. This rivet 25 and slot 24 permit said end portion of the spring 22 to move longitudinally relatively to the back 14, as the spring 22 is partially straightened by engagement with the side flanges 6 and the end flanges 5 and 7 bordering the exposure plane of the camera. Said spring is of a width greater than the exposure plane so as to bear along its side edge portions on said flanges 6, and is of greater length than said exposure plane so that its end portions extend beyond the ends of the exposure plane and rest upon the flanges 5 and 7.

The film-strip when stretched over the exposure plane rests along its side edges on said flanges 6 and between its ends upon the flanges 5 and 7, and the parts thereof resting upon said several flanges will be clamped firmly but yieldingly down upon the same by the pressure exerted by the spring 22, as will be obvious. That portion of the film-strip which is disposed in the exposure plane is thus held perfectly flat and in proper position for photographing. The spring 22 also acts to resist movement of the film-strip in any direction, thus requiring sufficient tension thereon to overcome such resistance when operating the take-up spool. It will also prevent the film-strip losing its tension in the exposure plane by virtue of any release of tension thereon due to yielding of the film-spools.

The said spring 22 also performs the function, as illustrated in Fig. —1—, of throwing the back 14 partially open upon releasing the latch members 20 and 21 from engagement with each other. Thereupon said back may be moved longitudinally to disengage the flange 17 from the flange 18 whereupon the back of the camera is open for the purpose of removing exposed film-strip and reloading the camera in the usual manner.

While I have shown the preferred embodiment of my invention in the accompanying drawings, it will be understood, of course, that such embodiment may be changed and varied by the exercise of mechanical skill and judgment without departing from the spirit of the invention as defined in the appended claims.

I claim as my invention:

1. In a camera of the kind specified having an exposure opening bordered by a continuous flange over which the film-strip is trained, a removable back for said camera, and a bowed flat spring member carried by said back and presenting its convex face to said continuous flange bordering said exposure opening and adapted to be deprived of its convexity and bear upon the whole of said continuous flange as said camera-back is closed, whereby to yieldingly clamp the film-strip against said flange.

2. In a camera of the kind described having an exposure opening bordered by a continuous flange over which the film-strip is trained, a removable back for said camera and a bowed flat spring member secured to said back at one end and having sliding engagement therewith at its other end, said member presenting its convex face to the flange bordering said exposure opening and adapted to be deprived of its convexity and bear upon said flange completely around said exposure opening as said camera-back is closed, whereby to yieldingly clamp the film-strip against the flange throughout its length.

In testimony whereof I have signed my name in presence of two subscribing witnesses.

GLENN J. MacDOWELL.

Witnesses:
M. M. BOYLE,
C. W. KIRSCH.